United States Patent [19]
Fromson et al.

[11] Patent Number: 4,486,279
[45] Date of Patent: Dec. 4, 1984

[54] APPARATUS AND METHOD FOR MAKING A LAMINATED CORE

[75] Inventors: Robert E. Fromson, Wilkins Township, Allegheny County; Maria E. Skutch, Trafford, both of Pa.; Charles S. Nunamaker; Francis A. Scheda, both of Amherst, N.Y.

[73] Assignee: Westinghouse Electric Corp., Pittsburgh, Pa.

[21] Appl. No.: 493,843

[22] Filed: May 12, 1983

[51] Int. Cl.³ .............. C25F 3/14; C25F 7/00; B23P 1/12; B23P 1/14
[52] U.S. Cl. .................. 204/129.5; 204/129.6; 204/129.7; 204/129.75; 204/212; 204/224 M; 204/284
[58] Field of Search ............... 204/129.1, 129.5, 129.6, 204/129.75, 224 R, 224 M, 225, 284, 271, 212, 129.7

[56] References Cited
U.S. PATENT DOCUMENTS

| 2,479,302 | 8/1949 | Bondley | 204/129.1 |
| 2,590,927 | 4/1952 | Brandt et al. | 204/224 R X |
| 2,784,155 | 3/1957 | Heinrich | 204/224 R X |
| 3,409,524 | 11/1968 | Olson | 204/129.6 X |
| 3,705,843 | 12/1972 | Sickels | 204/224 R X |
| 4,190,513 | 12/1980 | Jumer | 204/129.6 X |
| 4,326,933 | 4/1982 | Sabatka et al. | 204/129.6 |

FOREIGN PATENT DOCUMENTS

| 75198 | 8/1970 | German Democratic Rep. | 204/129.75 |
| 46-12885 | 4/1971 | Japan | 204/224 M |
| 727391 | 4/1980 | U.S.S.R. | 204/129.75 |

Primary Examiner—Donald R. Valentine
Attorney, Agent, or Firm—G. H. Telfer

[57] ABSTRACT

An apparatus and means for removing slivers and burrs from machined laminated components utilizes a salt solution, such as sodium nitrate, as the electrolyte which flows between a cathode and the laminated member which is connected to the positive terminal of an electrical power supply. The electrolyte is pumped into the gap between the cathode and laminated component and an electrical current flows between the laminated member and the cathode, removing metal which is depleted or released into the stream of electrolyte. The use of a salt solution, as opposed to an acidic solution, for the electrolyte fluid reduces the need for cleaning and neutralizing the acid remaining on the workpiece and, furthermore, reduces the potential hazards normally associated with the use of acids.

10 Claims, 6 Drawing Figures

APPARATUS AND METHOD FOR MAKING A LAMINATED CORE

BACKGROUND AND SUMMARY OF THE INVENTION

The present invention relates to the manufacture of laminated cores for dynamoelectric machines and, more particularly, to the removal of burrs and slivers from laminated cores by means of an electrochemical process.

Laminated magnetic cores are typically fabricated from sheet metal by a stamping process. The individual laminations are then stacked together to form a generally cylindrical assembly. The stack of laminations are then die cast, riveted, welded, clamped or otherwise restrained in order to maintain the geometric integrity of the assembly. When deviations in the geometric size of the laminated assembly due to fabrication variances are intolerable, the outer surfaces of the laminated core can be machined to correct size discrepancies. This machining operation is often used to remove enough material from the rotor to create the desired air gap between the rotor and stator of a dynamoelectric machine. When the rotor and stator laminations are punched from the same sheet metal stock, the rotor laminations are often punched from the central piece which remains after the annular stator lamination is produced. Therefore, in these cases the machining operation is necessary to create an air gap where, otherwise, one would not normally exist. Also, even when the stacked core is not machined, each lamination can have small burrs at its edges as a result of the punching operation itself.

The machining operation, which can either be turning, milling, broaching or grinding, unfortunately creates a multitude of burrs and slivers by smearing the edges of the individual laminations into adjacent laminations. This smearing creates electrical shorts between adjacent laminations and partially defeats the original purpose of the laminated structure which is to minimize the interlaminar conductivity. This smearing deleteriously affects the efficiency of the dynamoelectric machine in which the laminated component is to be incorporated. The original purpose of using individual laminations is to reduce eddy current losses in the dynamoelectric machine and the smearing between adjacent laminations creates eddy current paths which increase interlaminar conductivity and, therefore, core losses.

The above mentioned burrs and slivers can be reduced by buffing, tumbling, shot blasting, sanding or filing the laminated surface following the machining operation. These operations are tedious and costly and tend to be less than perfectly effective. Some means for totally removing the burrs, slivers and smears from the machined surfaces of laminated cores is required because, in electrical apparatus, it is necessary to employ a magnetic core and the electrical efficiency of this magnetic core is dependent upon the amount of electrical insulation between each adjacent lamination so that short circuits are not present between the laminations when the magnetic core is subjected to alternating flux. Under the influence of a magnetic field, each lamination generates a minute electrical potential which could cause a large loss of electrical energy in the form of heat, if it is short circuited to adjacent laminations. Following the machining operation, the burrs and slivers are located almost exclusively at the cut edges of the metal laminations and it is at these locations where short circuits between adjacent laminations can take place because of the presence of these slivers and burrs.

U.S. Pat. No. 2,590,927, which was issued to Brandt et al. on Apr. 1, 1952, describes an electrolytic method for removing the burrs from the cut edges of laminated cores. The method described in the Brandt patent utilizes phosphoric acid in conjunction with an electrical current to render the phosphoric acid active for the intended purpose of removing the above mentioned metallic slivers and burrs. By electrically connecting the laminated core to the positive terminal of a direct current source and disposing a negatively connected cathode proximate the machined surface, an electrical current can be passed through the electrolyte between the machined surface and the cathode. Under the influence of the electrical current, both burrs and slivers are etched away from the machined surface when subjected to the phosphoric acid solution.

The use of an electrical current in combination with a phosphoric acid solution is an improvement over prior methods which utilize acid alone in the absence of an electric current. U.S. Pat. No. 2,293,951 which was issued to Seastone et al. on Aug. 25, 1942 describes such a chemical etching operation which utilizes a solution of nitric, hydrochloric or sulfuric acid without the use of an electric current. An alternative method of treatment is described in U.S. Pat. No. 2,243,578 which was issued to Reardon on May 27, 1941 and which subjects the short circuited laminated core to an acid phosphate treatment.

Electrochemical machining and shaping is also described in U.S. Pat. No. 3,058,895 issued to Williams on Oct. 16, 1962 and in U.S. Pat. No. 3,365,381 issued to Fromson on Jan. 23, 1968. The Williams patent describes the shaping and contouring of electrically conductive and electrochemically erodable workpieces and discloses an apparatus for accomplishing this task. The Fromson patent discloses an apparatus for the electrolytic machining of a workpiece in which an electrode is operated in relation to the workpiece while an electrolyte fluid is passed through a fluid passage.

The use of an acid solution in the electrochemical machining or electrochemical deburring of laminated components introduces serious problems which inhibit the rapid mass production of cores utilizing these methods. When an acid bath is used to electrochemically machine a laminated component, a significant amount of the acid is dispersed over the laminated core and some of the acid solution is distributed between the laminations thereof. Therefore, adequate removal of the acidic solution must be accomplished, following the machining operation, in order that harmful corrosion does not take place within the laminated core following its subsequent assembly into a dynamoelectric machine.

The present invention utilizes a cathode which is disposed a preselected distance from the machine laminated surface and electrically connects the laminated component to the positive terminal of a direct current power source. The present invention utilizes a salt solution, such as sodium nitrate, instead of an acidic solution as an electrolyte between the cathode and the workpiece. The present invention, although preferably utilized with a sodium nitrate solution as the electrolyte, can be alternatively practiced with the use of any conductive electrolyte, such as sodium chloride. Sodium chloride is more corrosive than sodium nitrate and is, therefore, less desirable than sodium nitrate. The electrolyte should be pumped at a flow rate which will prevent a temperature rise above approximately 140° F. in order to prevent boiling. This relatively high flow rate will also diminish boundary layer effects, as will be discussed below, and provide a continuous liquid path across the electrolyte-filled gap.

The cathode of the present invention is equipped with means for delivering a sufficient quantity of electrolyte to the region between the machined surface of the laminated core and the most proximate surface of the cathode. In the preferred embodiment of the present invention, the electrolyte solution is pumped through the cathode and toward the machined laminated surface. The gap between the cathode and the laminated surface is determined by a number of mutually dependent parameters. If the gap is too small, electrical arcing can occur between the cathode and the laminated workpiece and, conversely, if the gap is too large, the effective resistance between the cathode and workpiece can be increased to a point where more power must be used to provide the current through the electrolyte interface. It has been found that a gap of approximately 0.010 inch avoids arcing and is compatible with normally available pump pressures and electrical power supply capabilities.

It has also been discovered that, by using a constant current electrical supply, the temperature in the region of the gap becomes significantly less critical than it would be with constant voltage power supplies. This is due to the fact that the constant current power supply automatically adjusts for rising temperatures or varying salt concentrations by appropriately altering its voltage and thus obviates the need for complex temperature controls or a means for holding salt concentrations with close tolerances. This characteristic greatly simplifies the required control and monitoring systems for electrochemical machining operations.

The present invention, by using a salt such as sodium nitrate, avoids the corrosive characteristics normally associated with acid solutions and reduces the potential hazards which are normally associated with the use of acid solutions such as the possibility of acid splahes and the inhalation of acidic fumes. Another significant advantage of using a salt instead of an acid solution is that the salt solution is essentially nonconsumable and requires only the occasional addition of water to the electrolyte supply during the electrochemical deburring operation. Acid solutions, on the other hand, must be constantly replenished because of their chemical nature and the fact that acids are depleted during electrochemical machining or deburring operations.

BRIEF DESCRIPTION OF THE DRAWING

The present invention will be more completely understood by a reading of the description of the preferred embodiment in conjunction with the drawing in which.

DESCRIPTION OF THE PREFERRED EMBODIMENT

The present invention relates generally to electrochemical machining of components and, more particularly, to the electrochemical deburring of laminated rotors for electrical machines by providing a stream of a salt solution electrolyte between a cathode and the subject laminated component.

Figure 1:
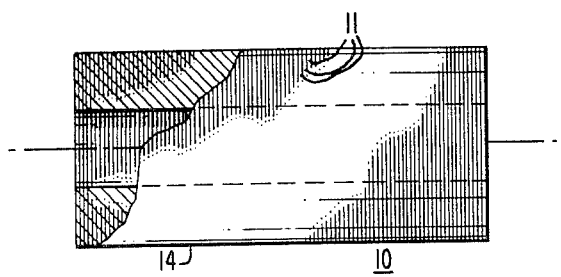
FIG. 1 illustrates a typical laminated core for use in a dynamoelectric machine rotor.

The present invention is applicable to the deburring of any component in which metallic laminations are used, but is most particularly applicable to cylindrically shaped laminated rotors used in dynamoelectric machines. FIG. 1 illustrates a typical laminated rotor 10 which is generally cylindrical in shape and symmetrical about a central axis. The rotor 10 comprises a multitude of laminations 11 which are stacked together in such a way so as to form a generally cylindrical assembly. When the multitude of laminations 11 are stacked and fastened together, the outer cylindrical surface 14 may exhibit some dimensional variations due to the potential discrepancies in geometric size between any particular lamination and its adjacent laminations. To correct these possible variations, and to provide the appropriate air gap, laminated rotors are generally machined on their outer cylindrical surface 14. This machining operation, as described above, forms a plurality of slivers and burrs and exhibits considerable smearing of the laminations' edges. It is the smearing of this surface 14 which produces a plurality of electrical shorts between adjacent laminations and creates many potential current paths between the laminations which can increase eddy current losses in the rotor of the electrical machine and, therefore, significantly reduce its efficiency. In many cases, the efficiency of a motor can be severely decreased by these increased eddy current losses. It has been found that smears and burrs can account for 20% of eddy current losses in the rotor and, in the case of small rotors, an even greater percentage.

Figure 2A:
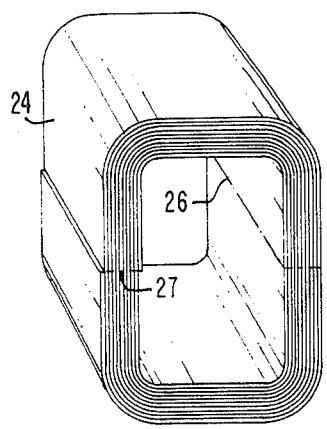
FIG. 2a shows the first step in producing a laminated U-shaped yoke for a transformer.
Figure 2B:
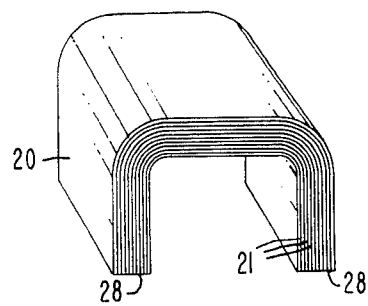
FIG. 2b illustrates the resultant U-shaped yoke formed as a result of the operation illustrated in FIG. 2A.

FIGS. 2a and 2b illustrate another type of component for which the present invention is applicable. The U-shaped yoke 20 shown in FIG. 2b consists of a multitude of laminations 21 and is appropriate for use as the core of a transformer. The U-shaped yoke 20 of FIG. 2b is generally made by winding a generally O-shaped component 24 as illustrated in FIG. 2A. The O-shaped core is manufactured by continually winding a strip of sheet metal around a mandrel. Following this winding operation, the O-shaped component 24 is cut into two pieces by sawing the O-shaped component 24 in the area depicted by the dotted lines 26 and 27. This machining results in the formation of two U-shaped members as illustrated in FIG. 2b. However, this sawing operation produces a multitude of slivers and burrs along the cut edges 28 of the laminations. These slivers and burrs and associated smearing of the lamination edges can produce many electrical shorts and aggravate the losses of the electrical machine in which the U-shaped component 20 is assembled.

Although the present invention has many alternative applications, it should be understood that the smeared surfaces of the components shown in FIGS. 1 and 2b illustrate typical applications in which the present invention can significantly improve the electrical efficiency of an electrical machine by electrochemically deburring the smeared edges of a laminated component. In FIG. 1, the subject surface would be the outer cylindrical surface 14 of the rotor 10 and in FIG. 2b the subject surface would be the generally flat surfaces 2b which result from the sawing operation along the lines 26 and 27 in FIG. 2a.

Figure 3:
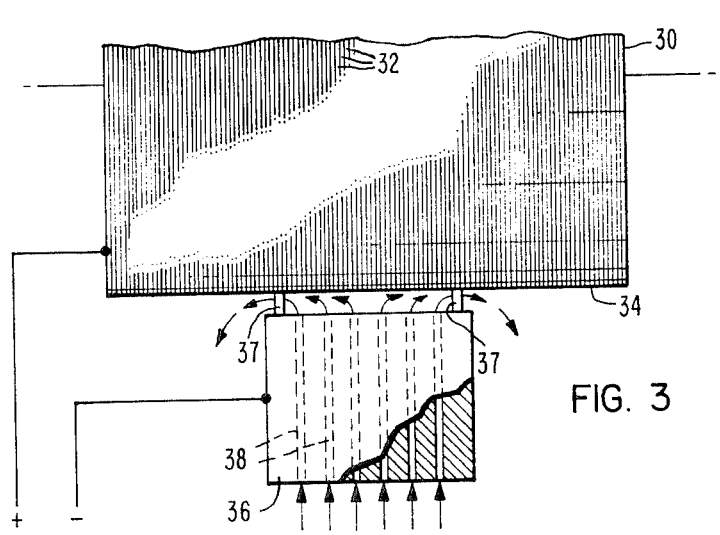
FIG. 3 schematically depicts a laminated component being electrochemically deburred by the present invention.

FIG. 3 illustrates the present invention applied to the electrochemical deburring of a generally cylindrical laminated rotor 30. The rotor 30 which comprises a multitude of individual laminations 32 has an outer cylindrical surface 34 which, for the various reasons described above, has been machined in such a way as to produce a plurality of slivers and burrs and considerable smearing of the outer edges of the laminations 32. This type of application of the present invention would consist of the disposition of a cathode 36 proximate the outer cylindrical surface 34 of the rotor 30. The cathode 20 is maintained at a predetermined distance away from the cylindrical surface 34 in order to prevent potential electrical arcing between the cathode 36 and the rotor 30. This predetermined distance can be maintained by the use of insulative surfaces, such as the buttons 37, which ride on the outer surface 34 and maintain a generally constant gap distance between the cathode 36 and the rotor 30. The rotor is connected in electrical communication to the positive terminal (anode) of a direct current source and the cathode is electrically connected to the negative terminal of that source. These electrical connections are shown schematically in FIG. 3.

A preferred embodiment of the present invention incorporates a means for delivering a stream of electrolyte into the gap between the cathode 36 and the laminated surface 34 of the core 30. In FIG. 3, a plurality of holes 38 are provided in the cathode 36 so that the electrolyte solution can be pumped through the cathode 36 in the directions indicated by the arrows and into the gap between the cathode 36 and the laminated core 30. The electrolyte passes through these holes 38 and into the gap before flowing away from the region where the electrical current is passing between the laminated core 30 and the electrode 36. This electrolyte provides a conductive medium between the anodic core 30 and the cathode and permits an electrical current to flow therebetween. After passing through the gap region, the electrolyte flows away from the laminated core and is recirculated to a reservoir so that it can be again pumped through the electrode 36 and into the gap area. It should be understood that, although the electrode 36 in FIG. 3 is shown having a plurality of holes 38 therethrough, an alternative embodiment of the present invention could utilize a single electrolyte conduit in fluid communication with the gap region to enable the electrolyte to be supplied thereto along with a single path for the electrolyte to pass away from the gap.

Figure 4:
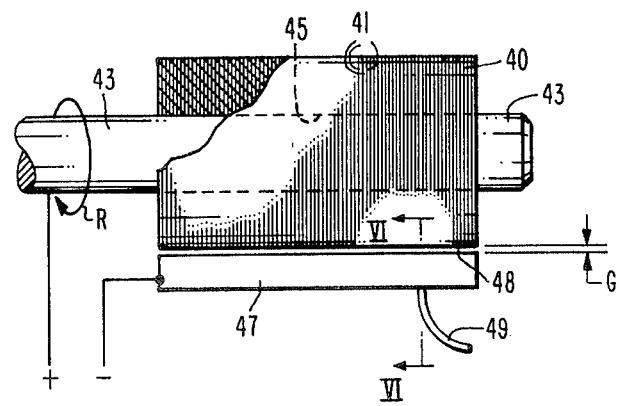
FIG. 4 illustrates a specific embodiment of the present invention for use in the electrochemical deburring of a cylindrical laminated rotor for a dynamo-electric machine.

FIG. 4 illustrates a particular embodiment of the present invention in which a laminated core 40, which is made up of a multiplicity of laminations 41, is supported on a mandrel 43 which passes through the core's central cylindrical opening 45. The mandrel 43 is connected to a means for rotating it about its central axis as shown by the arrow R. The mandrel 43 is connected to the positive terminal of a direct current power source and thus becomes the anode of an electrical circuit in which the power source is employed. The core 40 is mounted on the mandrel 43 in such a way that it is in electrical communication with the mandrel 43 and, therefore, with the positive terminal of the power source. A cathode 47 is connected to the negative terminal of the same power source and disposed proximate the core 40 in such a way so as to describe a gap of preselected magnitude G. The cathode 47 is provided with a means for supplying a constant flow of electrolyte to the region within the gap between the electrode 47 and the laminated surface 48 of the core 40. In FIG. 4 this means for supplying the electrolyte is shown as a conduit 49 which is connected in fluid communication with the gap region.

As the mandrel 43 rotates in the direction indicated by the arrow R, the core 40 rotates with it and, as it does, successive circumferential regions of the laminated surface 48 are placed in proximity with the cathode 47. As the electrical current passes from the anodic core 40 to the cathode 47, metallic slivers and burrs are removed by the electrochemical reactions taking place within the gap region. As the mandrel 43 rotates, successive portions of the laminated surface 48 are exposed to this electrical current and are thus deburred.

Figure 5:
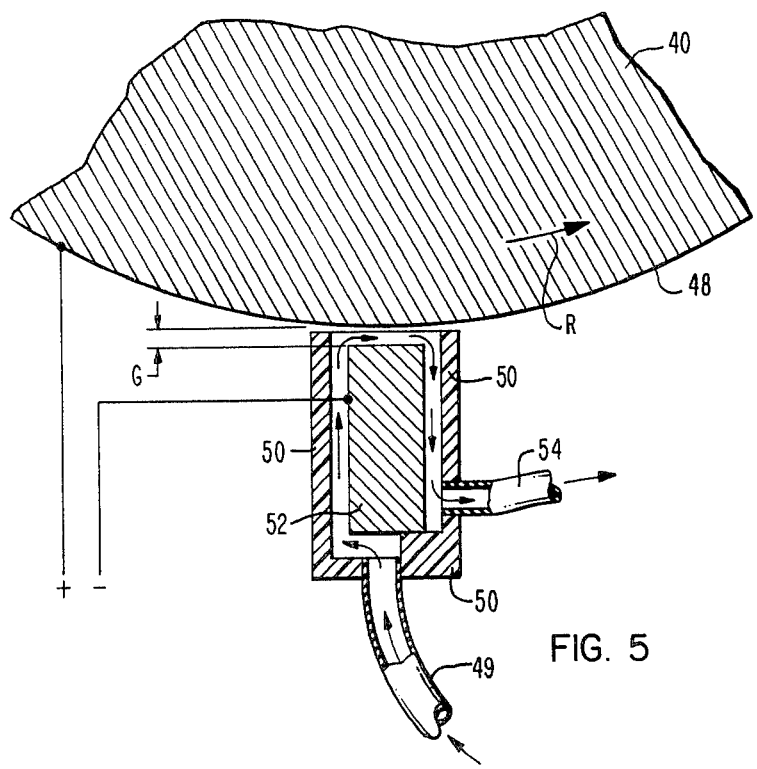
FIG. 5 shows a section view of the apparatus of FIG. 4.

FIG. 5 is a section view of the embodiment illustrated in FIG. 4. In the sectional view of FIG. 5, the rotor 40 with its surface 48, comprising of a multiplicity of laminated edges, is rotated in the direction shown by the arrow R past the cathode structure (reference numeral 47 in FIG. 4).

It should be understood that in the preferred embodiment which is illustraed in FIG. 5, the cathode structure (reference numeral 47 in FIG. 4) comprises a generally nonconductive outer structure 50 which houses a conductive cathode member 52. The cathode member 52 is connected in electrical communication with the negative terminal of a direct current power supply and is disposed a preselected distance G from the surface 48 of the core 40. Although it should be understood that the specific structure of the cathode member can vary within the scope of the present invention, the particular structure illustrated in FIG. 5 provides a conduit 49 which permits a constant stream of electrolyte to flow into the cathode structure and through the gap between the cathode member 52 and the core 40. The electrolyte then passes, in the directions shown by the arrows, through the gap area and out of the cathode structure through an exit conduit 54. With the rotor 40 connected to the positive terminal of a direct current power supply and a constant stream of electrolyte passing through the gap between the cathode 52 and the core 40, an electrical current can be maintained through this gap region. This electrical current causes the burrs and slivers to be electromechanically removed from the laminated surface 48 of the core 40 and pass away from the core 40 along with the electrolyte fluid.

Comparing FIGS. 3 and 5, it should be understood that the cathode 36 of FIG. 3 and the cathode member 52 of FIG. 5 are alternative embodiments and, depending on the particular application of the present invention, either could be utilized. The cathode 36, which incorporates a plurality of holes therethrough, has been found to enhance metal removal by its characteristic that directs the electrolyte fluid in a direction which is generally perpendicular to the laminated surface 34. This characteristic appears to enhance the electrical conductivity within the gap by overcoming boundary layer affects and more efficiently removing the spent electrolyte from the gap region. The cathode structure of FIG. 5, however, is less expensive to manufacture and, for most applications, is preferable due to its reduced costs.

It should be understood that, by making the cathode 47 equal in length to the length of the core 40, as shown in FIG. 4, the need to move the cathode 47 is eliminated. Comparing the cathode 47 of FIG. 4 to the cathode 36 of FIG. 3, therefore, illustrates this advantage. The cathode 36 of FIG. 3 does not extend over the entire region of the core between its axial ends and therefore would have to be moved in order to remove the burrs and slivers from the entire laminated surface 34 of the core 30. In this type of application, the insulative surfaces, or buttons 37, help to maintain the constant gap dimension between the cathode 36 and the machined surface 34. In comparison, the cathode 47 illustrated in FIG. 4 can be fixed in a stationary position since the rotation of the mandrel 43 and laminated core 40 would successively deliver every portion of the laminated surface 48 to close proximity with the cathode 47.

The electrolyte used in conjunction with the present invention can be any suitable salt solution which is capable of conducting an electrical current between the laminated core and the cathode of the present invention. However, it has been found that sodium nitrate is preferable to other alternatives such as sodium chloride or sodium chlorate. Regardless of the specific salt solution used, this type of electrolyte is preferable to acidic solutions because of the reduced corrosiveness experienced when salt solutions are used. Furthermore, acidic solutions are consumed during the electrochemical deburring operation whereas salt solutions are not. Continual reuse of salt solutions is possible as long as a sufficient quantity of water is added to make up for its loss due to the production of metallic hydroxides and hydrogen gas during the electrochemical deburring process. It should be understood that the particular chemical reactions that takes place during the electrochemical deburring operation will depend upon the metallic structure of the laminated core and the particular salt used. In the particular case where the laminated core is iron and the salt is sodium nitrate, the chemical reaction can be described by the following equation.

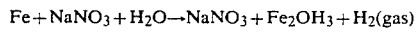
$$Fe + NaNO_3 + H_2O \rightarrow NaNO_3 + Fe_2OH_3 + H_2(gas)$$

It should be understood that this equation is descriptive of the exemplary reaction when sodium nitrate is used as an electrolyte and the laminated core is iron. Similar equations would be applicable when the subject metal is either manganese or chromium instead of iron and the electrolyte is sodium chloride or sodium chlorate. The resulting residue would be either manganese hydroxide or chromium hydroxide instead of iron hydroxide as illustrated in the equation and the resulting salt would be dependent on the electrolyte solution used during the electrochemical deburring operation.

Referring to FIGS. 4 and 5, it should be understood that the distance G between the core 40 and the cathode is determined by a variety of mutually dependent parameters. It should further be understood that various combinations of parameters can be utilized within the scope of the present invention since the parameters are mutually related and affect one another in various ways. For example, it is known that the existence of electrical arcing between the core and the cathode is dependent upon the voltage along with the dimension G of the gap region. The electrical arcing is also dependent on the flow rate of electrolyte through the gap region and this flow rate is, in turn, dependent upon the dimensions of the cathode structure and the pressure capabilities of the electrolyte pump which is used. Furthermore, with a constant current power supply the current density is a function of the amount of electrical current flowing between the core and the cathode along with the physical dimensions of the cathode's surface which is generally parallel to the laminated surface which is to be deburred.

It has been determined that ten thousand amperes will remove approximately one cubic inch of metal per minute and that a gap of approximately 0.010 inch between the cathode and the laminated surface permits efficient operation of the present invention without any significant arcing. The speed of rotation of the laminated core, in combination with the magnitude of the electric current and the surface area of the cathode, will determine the depth of metal removal accomplished per revolution of the core. It should be clearly understood that by varying the current magnitude, the rate of rotation of the core, the gap between the core and the cathode, the physical size of the cathode, process time, the flow rate of electrolyte through the gap, and the rate and depth of metal removal can be considerably affected. The precise determination of these parameters will vary for different applications and will depend on the available power supply and the capability of the electrolyte pump.

The present invention has been described in considerable detail and the preferred embodiment has been illustrated and discussed with a high degree of specificity, but it should be understood that alternative embodiments should be considered to be within the scope of the present invention. It should also be understood that the present invention provides a means for removing slivers and burrs from the smeared laminated surface of a laminated core with a resulting high degree of electrical efficiency of the core and with a reduced amount of corrosiveness affecting the core. It should further be apparent that the present invention avoids many safety hazards which are incumbent with the use of acidic electrolytes and also avoids the costly requirement of acid removal and neutralization following the electrochemical deburring process. It should also be obvious that the present invention eliminates the necessity for supplying continuing additional acid solution to the electrolyte supply because salt solutions, unlike acidic solutions, are not chemically exhausted during the electrochemical reaction. The present invention provides an economical means for deburring laminated components in a way that is suitable for mass production and which reduces the overall costs of the deburring operation.

The improvements are made possible by the use of high current densities which are obtained by the combination of a small electrolyte gap and a high electrolyte velocity. This permits higher production rates than would be possible with conventional tank deplating techniques.

A comparison of the present invention to known tank deplating techniques illustrates the advantages of the present invention. Since tank deplating, such as that disclosed in U.S. Pat. No. 2,590,927, involves an immersion of the workpiece, the effective working area is large and the resulting decreased current density causes a longer deburring time requirement. In comparison, the cathode of the present invention has a much smaller effective area and the current density is, therefore, much greater. Although the exact magnitude of this advantage depends upon the specific geometry of the workpiece, a rotor which is 4 inches long and 4 inches in diameter associated with a 0.25"×4" cathode illustrates an effective area advantage in favor of the present invention over conventional tank deplating methods. For a given current capacity, the current density is thus significantly higher and a rotor of this size can be deburred in approximately twenty seconds when done in accordance with the present invention. It has been found that metal removal rates using the present invention are many times greater than that available with standard tank deplating practice and the slivers are also removed without removing desirable base metal.

Although the present invention has been described above in particular detail and with specific parameters, is should not be considered to be so limited. Other embodiments which incorporate the concepts and characteristics of the present invention should be considered to be within its scope.

What we claim is:

1. A method of improving the electrical characteristics of a generally laminated core of an electrical machine that includes a stack of laminations, comprising:
   electrically connecting said laminated core in direct electrical communication with a positive terminal of a direct current source;
   disposing a cathode that is in direct electrical communication with a negative terminal of said direct current source proximate a surface of said laminated core with a gap therebetween, said surface having a plurality of exposed edges of the laminations of said laminated core;
   causing relative movement of said cathode and said surface by rotating said core about its central axis while said gap is maintained at a preselected distance; and
   causing a liquid to flow in a continuous stream filling said gap between said cathode and said surface, said liquid being a solution of a salt and water.

2. The method of claim 1, wherein:
   said salt is sodium nitrate.

3. The method of claim 1, wherein:
   said salt is sodium chloride.

4. The method of claim 1, wherein:
   said causing means directs said liquid in a direction generally perpendicular to said surface of said laminated core.

5. The method of claim 1, wherein:
   said preselected distance is approximately 0.010 inch.

6. The method of claim 1, wherein:
   said direct current source supplies a constant current that in cooperation with said cathode being disposed said preselected distance from said laminated core and with the flowing of said electrolyte causes a substantially constant current density to be established between said cathode and said surface for a substantially constant rate of material removal from said laminated core without arcing.

7. The method of claim 6, wherein:
   the flowing of said liquid is at a flow rate sufficient to maintain a temperature between said cathode and said laminated core limited sufficiently to prevent boiling and said preselected distance is about 0.010 inch.

8. Apparatus for deburring a laminated core that includes a stack of laminations, comprising:
   means for electrically connecting said laminated core to an anode of an electrical power supply;
   means for positioning a cathode of said electrical power supply proximate a surface of said laminated core with a gap therebetween, said surface having lamination edges exposed thereon;
   means for moving said surface and said cathode relative to each other comprising a rotatable mandrel on which said core is mounted;
   means for maintaining said gap at a preselected distance; and
   means for causing a fluid electrolyte to flow in a continuous stream filling said gap between said cathode and said surface, said fluid electrolyte being a solution of a salt and water.

9. The apparatus of claim 8, wherein:
   said salt is a sodium salt selected from the group consisting of sodium nitrate and sodium chloride.

10. Apparatus for deburring a laminated core that includes a stack of laminations, comprising:
   means for electrically connecting said laminated core to an anode of an electrical power supply;
   means for positioning a cathode of said electrical power supply proximate a surface of said laminated core with a gap therebetween, said surface having lamination edges exposed thereon;
   means for maintaining said gap at a preselected distance;
   means for causing a fluid electrolyte to flow in a continuous stream filling said gap between said cathode and said surface, said fluid electrolyte being a solution of a salt and water; and
   said cathode having a plurality of holes therethrough, each of said holes being generally perpendicular to said surface and in fluid communication with said causing means.

* * * * *